(12) United States Patent
Tejado Etayo et al.

(10) Patent No.: US 10,450,435 B2
(45) Date of Patent: Oct. 22, 2019

(54) POROUS CELLULOSIC MATERIALS AND PROCESS FOR THEIR PREPARATION

(71) Applicant: FUNDACIÓN TECNALIA RESEARCH & INNOVATION, San Sebastián-Guipúzcoa (ES)

(72) Inventors: Álvaro Tejado Etayo, San Sebastián-Guipúzcoa (ES); Alejandro Salvador Polo, San Sebastián-Guipúzcoa (ES); Jokin Hidalgo Betanzos, San Sebastián-Guipúzcoa (ES); Maider Azpeitia Lakuntza, San Sebastián-Guipúzcoa (ES); Ingemar Svensson, San Sebastián-Guipúzcoa (ES)

(73) Assignee: FUNDACIÓN TECNALIA RESEARCH & INNOVATION, San Sebastián-Guipúzcoa (ES)

( * ) Notice: Subject to any disclaimer, the term of this patent is extended or adjusted under 35 U.S.C. 154(b) by 107 days.

(21) Appl. No.: 15/526,422

(22) PCT Filed: Nov. 17, 2015

(86) PCT No.: PCT/EP2015/076861
§ 371 (c)(1),
(2) Date: May 12, 2017

(87) PCT Pub. No.: WO2016/079140
PCT Pub. Date: May 26, 2016

(65) Prior Publication Data
US 2017/0306124 A1    Oct. 26, 2017

(30) Foreign Application Priority Data
Nov. 21, 2014  (EP) .................................... 14382467

(51) Int. Cl.
*C08J 9/28*     (2006.01)
*D21C 9/00*    (2006.01)
(Continued)

(52) U.S. Cl.
CPC ................. *C08J 9/28* (2013.01); *C08B 15/00* (2013.01); *C08B 15/05* (2013.01); *D21C 9/001* (2013.01);
(Continued)

(58) Field of Classification Search
CPC ............. C08J 9/28; C08B 15/00; D21C 9/001
See application file for complete search history.

(56) References Cited

U.S. PATENT DOCUMENTS 3,261,704 A    7/1966  Stieg
4,543,410 A *  9/1985  Cruz, Jr. ................. A61L 15/28
                                                            106/164.01
(Continued)

FOREIGN PATENT DOCUMENTS

CA    2810627 A1    3/2012
WO    0146297 A2    6/2001
(Continued)

OTHER PUBLICATIONS

International Search Report dated Mar. 29, 2016 re: Application No. PCT/EP2015/076861; pp. 1-5; citing: US 2013/025807 A1 and US 2011/159272 A1.
(Continued)

*Primary Examiner* — Victor S Chang
(74) *Attorney, Agent, or Firm* — Cantor Colburn LLP

(57) ABSTRACT

A process for preparing a cellulosic sponge includes the steps of treating an aqueous suspension of cellulose fibers with periodate; adjusting the pH of the resulting dialdehyde cellulose fibers suspension to a value between 2.5 to 5.5; freezing the suspension obtained and thawing the three
(Continued)

dimensional structure to render the cellulosic sponge. The process may further include a step of drying to render a cellulosic foam. Both the new sponge and the new foam may also be further chemically modified obtaining a broad variety of derivatives with tailored properties which are useful in many different applications.

15 Claims, 2 Drawing Sheets

(51) Int. Cl.
    *C08B 15/00*     (2006.01)
    *C08B 15/05*     (2006.01)

(52) U.S. Cl.
    CPC ...... *C08J 2201/026* (2013.01); *C08J 2301/02* (2013.01)

(56) References Cited

U.S. PATENT DOCUMENTS

2011/0159272 A1   6/2011   Yue et al.
2013/0025807 A1   1/2013   Wenersson et al.
2014/0079931 A1   3/2014   Berglund et al.
2014/0134088 A1   5/2014   Gebald et al.

FOREIGN PATENT DOCUMENTS

WO     2012032514 A1   3/2012
WO     2014011112 A1   1/2014

OTHER PUBLICATIONS

Written Opinion dated Mar. 29, 2016 re: Application No. PCT/EP2015/076861; pp. 1-9; citing: US 2013/025807 A1.
Nicholas T. Cervin et al. "Lightweight and Strong Cellulose Materials Made from Aqueous Foams Stabilized by Nanofibrillated Cellulose" Biomacromolecules, 2013, vol. 14, pp. 503-511.
Gary Chinga-Carrasco et al. "Pretreatement-dependent surface chemistry of wood nanocellulose for pH-sensitive hydrogels", J Biomater Appl, Apr. 8, 2014. p. 1-11, http://jba.sagepub.com/content/early/2014/04/08/0885328214531511.
Roxane Gavillon et al. "Aerocellulose: New Highly Porous Cellulose Prepared from Cellulose#NaOH Aqueous Solutions", Biomacromolecules, Nov. 28, 2008, vol. 9, No. 1, p. 269-277.
Hao Jin et al. "Nanofibrillar cellulose aerogels", Colloids and Surfaces A: Physiochem Eng. Aspects, 2004, vol. 240, pp. 63-67.

* cited by examiner

POROUS CELLULOSIC MATERIALS AND PROCESS FOR THEIR PREPARATION

TECHNICAL FIELD

The present disclosure is related to new improved cellulosic materials, obtained from cellulosic fibers through a cryogenation and thawing process. Specifically the disclosure relates first to a new cellulosic sponge and a new cellulosic foam obtainable from the new cellulosic sponge, and secondly it also relates to a wide variety of cellulosic products obtained by diverse chemical modification routes of the cellulosic sponge and/or the cellulosic foam with tailored properties, which are useful in multiple applications, like in thermal and/or acoustic insulation, packaging, biomedicine, cleaning, separation technologies, protective equipment, etc.

BACKGROUND

Cellulose is the most abundant natural polymer on Earth and it is composed of linear chains of 1,4-D-glucopyranose units. It exists in nature in various forms, but primarily as the only component of cellulose nanofibers (ca. several micrometers long and 5-20 nanometers wide structures) which in turn are the major component of cellulose fibers (ca.1-4 milimeters long and 20-50 micrometers wide), the fibrillar component of higher plants.

Modern Materials Science has developed many examples of low density materials able to provide specific features. A number of products exist today based on different types of low-density cellulosic materials (also known as cellulosic foams or aerogels) bearing different functionalities. Foam compositions cover a wide range of products such as sponges, thermal and acoustic insulation materials, packing materials, personal care or medical products to cite only a few. In addition to the processing costs, the key parameters to make it useful for either application are the physical properties (density, structural consistency, absorbency, surface energy . . . ) and the functionalities that it bears (fire performance, biocompatibility, bioactivity, selective solvent affinity, etc.).

One well-documented strategy for obtaining low density cellulosic materials is adding porogens (insoluble particles like trisodium phosphate, sodium sulfate or polyethylene glycol, that are later leached out to produce pores) to a cellulose solution; U.S. Pat. No. 3,261,704 describes the basis of this process, while U.S. Pat. No. 3,261,704 provides examples of using porogens. Another cellulose foam creating strategy, changes the porogens for blowing agents as the way to create pores:

WO2014011112A1 provides examples of this. Nearly all these products using either porogens or blowing agents are made from a viscose starting material (cellulose, originally fibrous, that has been chemically converted into a thermoplastic polymer). Disadvantages of using viscose include the long preparation process, the high purity cellulose required and the severe environmental discharges produced by the process.

There are also a number of processes developed to produce low density cellulosic materials out of cellulose fibers. Some approaches are based on the use of organic solvents which are finally removed through evaporation (e.g. CA2810627A1; WO0146297A2). Greener approaches use aqueous systems which are then removed either by freeze-drying (e.g. US2014134088A1, WO2012032514; Jin et al. Colloid Surface A 240, 63, 2004) or drying under supercritical conditions (US2014079931A1; Gavillon and Budtova, Biomacromolecules 9, p. 269, 2008). Both strategies look to avoid the presence of liquid water between the highly hydrophilic cellulose fibers responsible of promoting strong capillary attraction between them (upon drying) what in turn densifies the final product. Both techniques require pressurized reactors with excellent temperature control, and thus are expensive and very difficult to industrialize.

Moreover, both freeze-drying and drying under supercritical conditions give rise to products with low resistance to water which easily lose their 3D structure (since the fibers are held together by highly water sensitive hydrogen bonding) and moderate mechanical performance. Since these characteristics limit their potential applicability in some cases, sometimes these products are later improved with extra treatments, such as chemically crosslinking cellulose fibers with specific reactants (Chinga-Carrasco and Syverud, J Biomater Appl 0, p. 1, 2014) which, in addition to raising the cost, affect negatively the recyclability of cellulose.

Cellulose- and especially cellulose fiber-based materials typically require strong functionalization and/or additivation in order to overpass cellulose inherent limitations in terms of water resistance, fire performance, biological attacks, compatibility with polymeric matrices, biocompatibility, etc. "Functionalization" implies that a substance interacts with the cellulose fibers creating stable bonds, such as covalent, ionic, hydrogen bonding, van der Waals, etc. On the other hand, "additivation" may refer to substances that are just retained or entrapped by the cellulosic structure. However, due to the bad resistance to water and instability of the 3D structure mentioned before, existing cellulose products (especially foams) are very limited to post-treatments in general and more particularly to water-based post-treatments. Accordingly, some very interesting water-based modification techniques, such as the layer-by-layer technique which is typically driven by electrostatic interactions, cannot be applied.

In view of the above exposed there is the need in the state of the art of providing new cellulosic products with improved properties, such as the water stability, so that they can be easily chemically modified by post-treatment, especially in water-based media, to various features and different grades, in order to reach as many potential applications as possible.

DETAILED DESCRIPTION OF THE DRAWINGS

The present disclosure relates in a first aspect to a process for preparing a cellulosic sponge which comprises the following steps:
(i) treating an aqueous suspension of cellulose fibers with periodate to render a dialdehyde cellulose fibers suspension,
(ii) adjusting the pH of the dialdehyde cellulose fibers suspension to a value between 2.5 and 5.5, (iii) freezing the suspension obtained in step (ii) to render a three dimensional structure, and
(iv) thawing the three dimensional structure obtained in step (iii) to render the cellulosic sponge.

The term "cellulose fibers" as used in the present disclosure should be understood to comprise all cellulose fibers, cellulose nanofibers of any kind (including cellulose microfibers, nanofibers, nanocrystals as well as bacterial cellulose) and mixtures thereof, with or without previous modifications, to which the present disclosure applies indistinctly. The aqueous suspension of cellulose fibers to be treated with periodate can be readily prepared by a skilled person by well-known processes in the art. It is also commercially obtainable for example as a suspension of never dried thermomechanical pulp.

The disclosure involves first treating an aqueous suspension of cellulose fibers with periodate, thus creating aldehyde groups in their surface, and rendering a dialdehyde cellulose fibers suspension. This treatment is well-known to any person skilled in the art. In a particular embodiment sodium periodate is used. Ethylene glycol may be used to stop the reaction. In detail, cellulose fibers are first converted into dialdehyde cellulose fibers through periodate oxidation reaction. After filtering and cleaning the resulting reaction product, a water suspension of these chemically modified fibers is obtained.

The aldehyde content may be determined according to the known hydroxylamine hydrochloride method (ISO 11402: 2004), resulting in an aldehyde concentration which may vary within broad ranges, like from 0.05 to 12.3 milimol per gram of fibers ([CHO]=mmol/g), more particularly from 0.1 to 7.5 mmol/g, or more particularly from 1 to 3.5 mmol/g.

Figure 1:
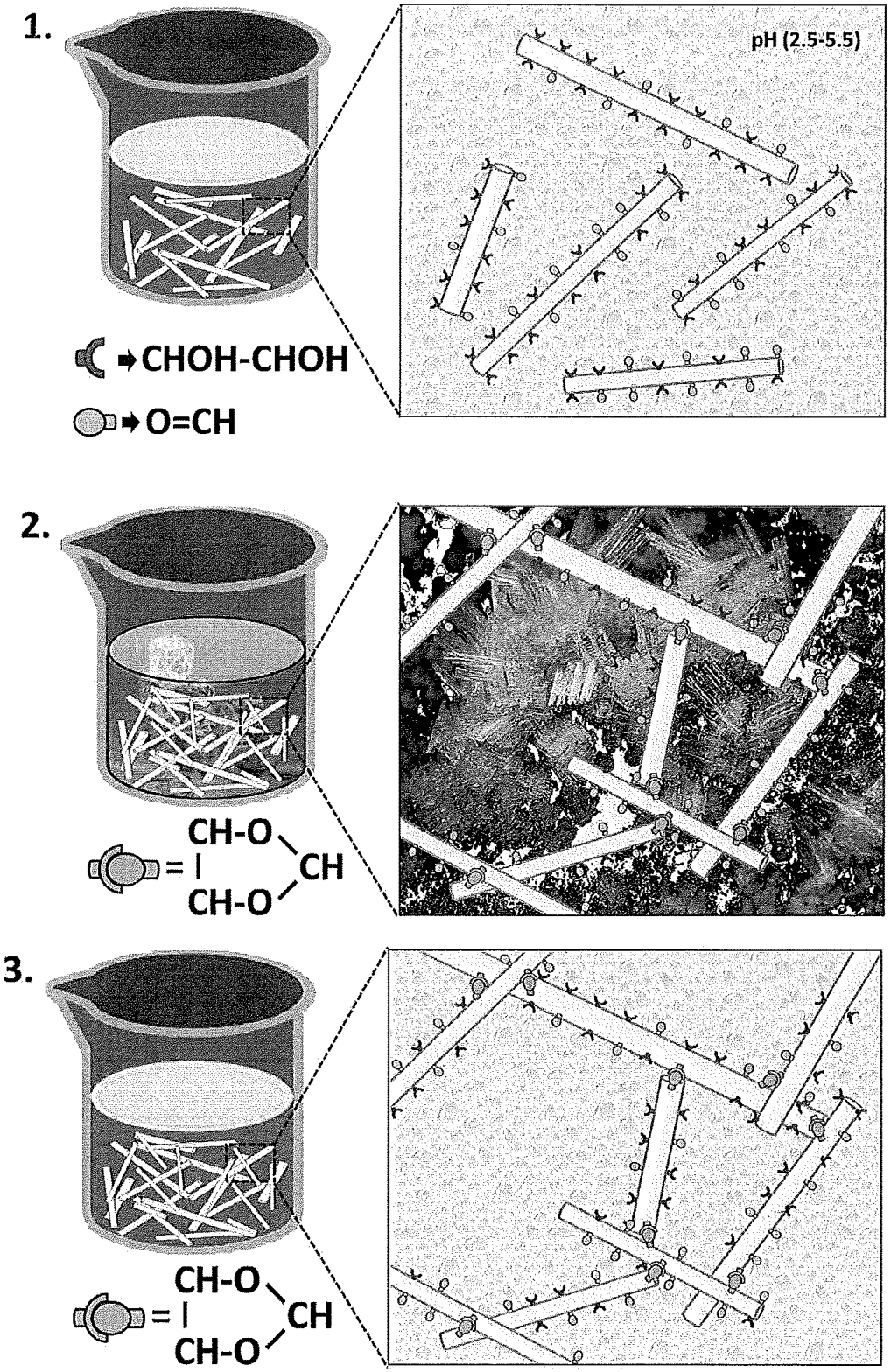
FIG. 1: scheme of the process for preparing the cellulosic sponge of the disclosure. The tubular shapes represent cellulose fibers.
Figure 2:
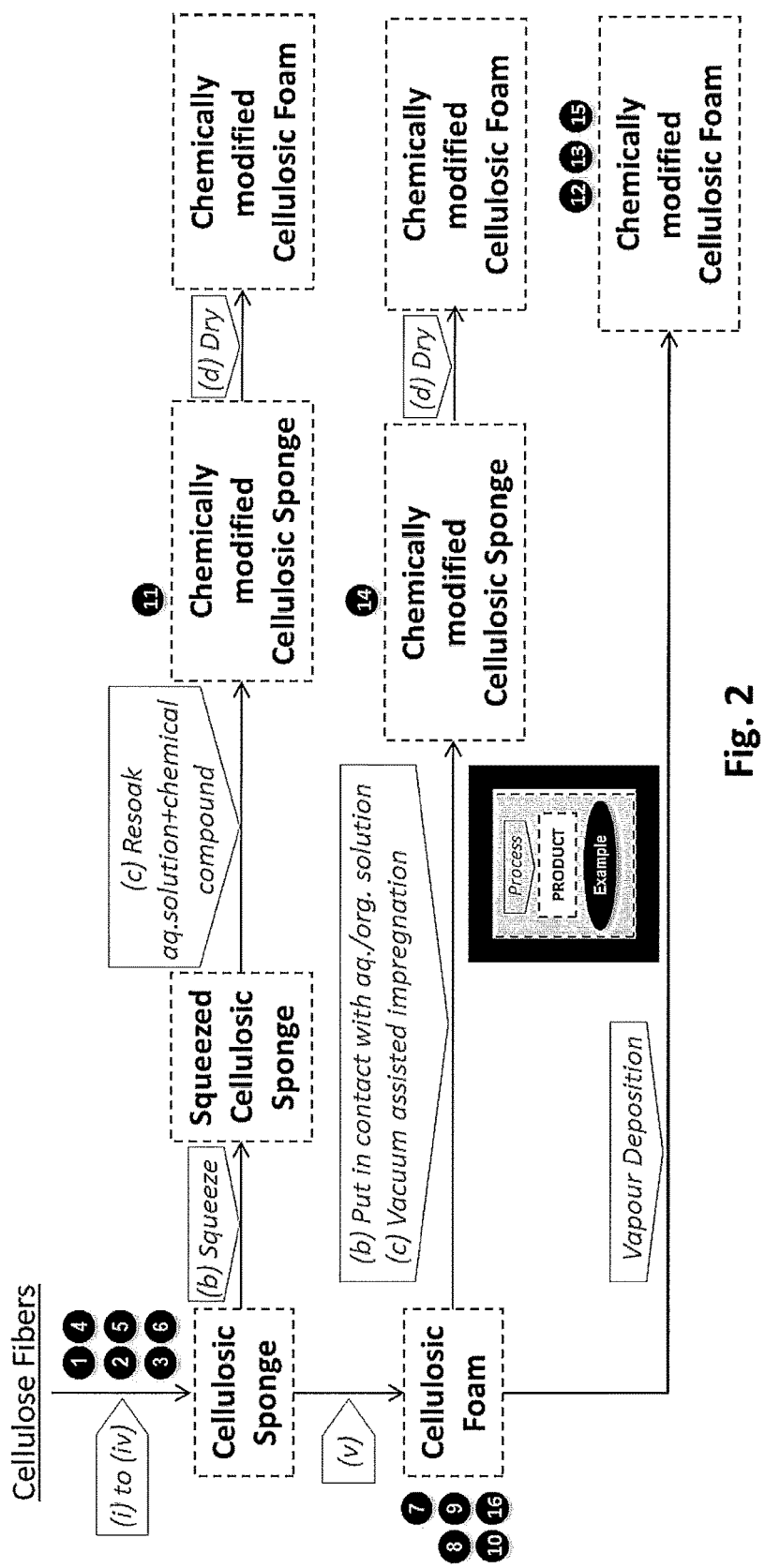
FIG. 2: schematic representation of the disclosure in particular of the cellulosic sponge of the disclosure, the process for preparing the foam of the disclosure from the cellulosic sponge, and different routes for the preparation other cellulosic products starting from the sponge or the foam.

Thereafter, the pH of the dialdehyde cellulose fibers suspension is adjusted to a value of pH 2.5 to 5.5 to allow the reaction of the aldehydes with hydroxyls (see FIG. 1.1), rendering cyclic acetal groups bonding the fibers (FIGS. 1.2 and 1.3). According to a particular embodiment the pH is adjusted to a value comprised between 2.7 and 5, preferably 3 and 4. The pH is adjusted usually with an acid, such as, but not limited to, glacial acetic acid or HCl. The importance of the pH value in this process is illustrated in Examples 1, 2, 3, and in the comparable Examples 4, 5 and 6, where the pH value was outside the above mentioned range and no cellulosic sponge was obtained.

The solid content of the dialdehyde cellulose fiber suspension can be controlled and regulated in each case, to give rise to cellulosic sponges and foams, of different final densities and rigidities as explained further below.

In a particular embodiment the solid content after pH adjustment is between 0.05 to 50 wt % in respect of the total weight of the suspension. In another particular embodiment the solid content is between 1 and 30 wt %, more particularly between 1.5 and 10 wt %. In a preferred embodiment the solid content is from 2 to 4 wt % in respect of the total weight of the suspension.

In step (iii) the dialdehyde cellulose fibers suspension resulting from step (ii) is poured in a container, like a mold or a tray and then frozen at a temperature which typically can range between −1 and −25° C., more particularly at a temperature between −15 and −20° C., although lower temperatures are also possible without limitation. These conditions allow the reaction of aldehyde groups (−CHO) with hydroxyls (−OH) which, together with the presence of liquid water during the freezing process, are surprisingly found to promote the formation of a very stable 3D structure inside the ice, which is not created at other pH conditions. Aldehyde groups are found to react with two neighbouring hydroxyl groups (i.e. diol) giving rise to stable cyclic acetals; provided that water is progressively removed from the reaction system, this is a thermodynamically favoured reaction that generates stable covalent bonds. In the present aqueous cellulose suspension, aldehyde groups have been introduced in the surface of some fibers in step (i) while diols are naturally present on every (unmodified) glucopyranose unit of cellulose. The growth of ice crystals progressively confines the dissolved chemicals (the lower the temperature the lower the solute's solubility) and the dialdehyde cellulose (DAC) fibers to the interstitial areas between the crystals, which at the same time promotes the physical formation of a 3-dimensional structure, increases the concentration of the reactive entities, maximizes the number of contact points among the fibers (i.e. reacting species), and more importantly removes the liquid water from the reaction medium, allowing the displacement of the reaction equilibrium towards the formation of cyclic acetal bridges between an aldehyde of one fiber and a diol of another fiber.

After the step of freezing, thawing the frozen 3D resulting structure renders a new cellulosic sponge (FIG. 1.3). Thawing is generally carried out at ambient temperature (typically comprised from 10 to 40° C., although any higher temperature is also valid) and takes typically around 24 hours depending on the size of the 3D structure and the temperature. This cellulosic sponge obtained according to this preparation process constitutes another aspect of the disclosure. It keeps the shape of the container used in the freezing step and gets the consistency of a sponge totally soaked in an aqueous medium.

The disclosure relates to a cellulosic sponge, hereinafter also referred to as the cellulosic sponge of the disclosure which presents unique properties as described below. For example, it is highly water absorbent. It has been tested to retain more than 200 times its weight of water and this value can be further increased easily by chemically modifying the cellulosic sponge with specific chemical compounds which increase the hydrophility of the sponge (e.g. with carboxymethyl cellulose (CMC)) by the process described below.

The cellulosic sponge of the disclosure is a covalently built, consistent, 3D structure. It comprises a three dimensional structure of cross-linked cellulosic fibers which are bonded by cyclic acetal groups. These bonds are formed as above disclosed between at least an aldehyde group of a fiber and a diol of a different fiber. The surprising properties of the new 3D structure can only be justified in that the majority of the bonds in the three dimensional structure of cross-linked cellulosic fibers are cyclic acetal groups. The presence of other types of bonds between fibers such as acyclic acetal groups in small proportion is not discarded.

The nature of the covalent, cyclic acetal bonds gives rise to a new cellulosic product with high durability against both strong acidic (pH<1) and moderate alkaline (pH>9) conditions, in particular between about pH 0.3 and about pH 9.5. Examples described later, illustrate this stability of the cellulosic sponge at a very wide pH range from pH 0.5 to 9.3. This not only widens the range of its applications but also opens up the possibility of subsequently chemically modifying the cellulosic sponge, by many different chemical routes, some of them even under some severe conditions, to prepare new chemically modified cellulosic sponges, which are provided with the present disclosure.

Cyclic acetals are more resistant to hydrolysis than acyclic acetals and also than hemiacetals, In addition cyclic acetals, just as any acetal, are reversible, rendering the starting aldehyde and diol. Example 10 shows that the structure of the cellulosic sponge gets destroyed within a few minutes at pH 10 and higher. That means that after being formed, the sponge, as well as its dried derivative the cellulosic foam, can be destroyed by simply increasing the pH to that limit. This allows easily recovering the chemically modified cellulose fibers and reusing them again, even for the same application allowing its recycling as shown in Example 10 in a further cellulosic sponge or foam.

The process above described for the preparation of the cellulosic sponge may further comprise further steps, in order to prepare a chemically modified cellulosic sponge and optionally further, a chemically modified cellulosic foam.

Accordingly, a major advantage of the cellulosic sponge of the disclosure is that it can be further chemically modified through very simple chemical modification routes to render a chemically modified cellulosic sponge, which is a further aspect of the disclosure. These chemical modifications are carried out according to well-established recipes, conferring the sponge with specific properties in different degrees, making the cellulosic sponge of the disclosure exploitable in multitude of applications, like hygiene products, biomedical products, composites for construction, etc. Moreover, these routes are advantageously carried out in aqueous media. Due to the well-known chemistry of the cellulose fibers, these routes can be readily implemented by the skilled person.

The process for the preparation of the cellulosic sponge described before can thus further comprise a step of:
 (b) squeezing the cellulosic sponge obtained in step (iv), and optionally further the step of:
 (c) re-soaking the squeezed sponge obtained in the previous step with an aqueous composition comprising at least one chemical compound which interacts with or is retained by the cellulosic fibers to obtain a chemically modified cellulosic sponge; and optionally further the step of
 (d) drying the chemically modified cellulosic sponge to render a chemically modified cellulosic foam.

Water can be easily squeezed out of the sponge by simple mechanical means, like pressing by hand or any other known means, without damaging the sponge. An advantage of the stable 3D structure of the sponge is that the shape acquired by the sponge after pressing remains, due to fiber-fiber hydrogen bonds interactions. This squeezed cellulosic sponge, which constitutes a further aspect of the present disclosure, behaves as a shape-memory material when it is put back in contact with water, as it recovers completely (~100%) the initial shape that the cellulosic sponge had before being pressed. The amount of water in the squeezed cellulosic sponge is variable, depending on the amount of water eliminated by squeezing, and is always lower than the amount of water present in the cellulosic sponge and higher than the amount of water present in the cellulosic foam. In a particular embodiment the squeezed sponge comprises between 10 and 50 wt % solids, and 50 to 90 wt % water, more particularly between 20 and 40 wt % solids, and 60 to 80 wt % water, even more particularly between 30 and 35 wt % solids and 65 to 70 wt % water. Other ranges are also possible.

At the same time however, the squeezed cellulosic sponge remains totally pressed if it is put in contact with other solvents different from water, such as alcohols, like ethanol. In this case, not even a fraction of the original shape of the cellulosic sponge is recovered. The cellulosic sponge of the disclosure thus shows the capacity of discriminating among different liquids, even between two with relatively similar polarities such as water and ethanol. This feature is in turn exploitable on separation technologies comprising the use of the cellulosic sponge of the disclosure.

Steps (b) and (c) can be carried out according to different known techniques. In a particular embodiment the cellulosic sponge is submitted to a squeezing-soaking technique, according to which the water contained in the cellulosic sponge is squeezed, and the resulting squeezed sponge is re-soaked with an aqueous composition comprising at least one chemical compound which interacts with, or is retained by, the cellulosic fibers to obtain a chemically modified cellulosic sponge.

This squeezing-soaking technique opens up infinite possibilities of reaching the entire volume of the cellulosic 3D structure with certain chemical compounds which can interact with or be retained by the cellulosic fibers, thus conferring the cellulosic sponge new functionalities. In principle there is no limitation concerning the type of chemical compounds that can be incorporated in the cellulosic sponge bringing new characteristics and rendering new products as long as they can interact with or are retained by the 3D fiber structure and can either be soluble in water or be effectively transported by water. The term effectively transported in water refers in the context of the present disclosure to chemical compounds which can build microemulsions, colloids, suspensions, etc. Remarkably, the steps (b) and (c) can also be carried out following an electrostatically driven layer-by-layer deposition technique, which can only be applied on water-resistant structures (and in some cases also pH resistant structures).

In general the chemical compounds that can be incorporated to the 3D structure, thus bringing to it new characteristics in the sponge, may be classified in those which are considered to interact with the cellulosic fibers and those which are considered to be retained by the cellulosic fibers.

In the first case, these chemical compounds are reacting species which interact and functionalize the cellulose fibers; in the second case these chemical compounds are non-reacting species, in the sense that they are merely retained and additivate the 3D cellulosic structure. Interacting with or functionalizing the cellulose fibers in the context of the present disclosure implies that a chemical compound creates stable chemical bonds with the fibers, such as covalent, ionic, electrostatic interaction, hydrogen bonding, van der Waals, or mixtures thereof, etc. Being retained by the cellulosic fibers or additivating them, refers in the context of the present disclosure to the fact that the chemical compound in question is just entrapped within/by the cellulosic 3D structure. Following that definition and the process steps mentioned before (squeezing and re-soaking), multitude of chemical compounds can be potentially used to bring new functionalities in the cellulosic sponge of this disclosure or additivate it which the skilled person can readily recognize and put into practice following well-established recipes, making the cellulosic sponge of the disclosure exploitable in multitude of applications. Further drying the chemically modified cellulosic sponge according to step d) renders the corresponding chemically modified cellulosic foams which also find application in multiple fields Non-limiting examples of chemically modifying the cellulosic sponge are provided in this patent application to merely illustrate the numerous possibilities which are to be considered within the scope of the present disclosure.

According to a particular embodiment, the cellulosic sponge is squeezed and then re-soaked with an aqueous solution containing a compound with the ability of forming covalent bonds with the hydroxyl groups of cellulose, such as the so called papermaking sizing agents (e.g. alkyl ketene dimer -AKD-, alkenyl succinic anhydride -ASA-, etc.), or containing a compound with the ability of forming covalent bonds with the dialdehyde of the cellulose, such as primary amine ($NH_2$)-containing species. Examples of the well-known papermaking sizing agents are among others alkyl ketene dimer -AKD-, or alkenyl succinic anhydride -ASA-. According to a preferred embodiment the compound is AKD.

In respect to the primary amine ($NH_2$)-containing species that may be used in the disclosure there is no particular limitation other than those that the skilled person can readily recognize. Among all the possible species the following can be cited: C1-C6 alkylamines, C1-C6 alkyldiamines, wherein the C1-C6 alkyl group can be linear or branched alkyl group, such as methyl-, ethyl-, i-propyl, n-butyl, i-butyl; benzyl amine, chitosan, polyamideamine-epichloridrine resin, or proteins.

As above disclosed the process may further comprise a step (d) of drying chemically the modified cellulosic sponge by any conventional mean (i.e. in an oven) that renders new cellulosic foams which are functionalized throughout the entire volume. In this sense example 11 illustrates a more particular embodiment where the sponge is squeezed and re-soaked in 1 wt % alkyl ketene dimer (AKD, Aquapel T215, Ashland) in water emulsion, which, upon heating (e.g. drying), form covalent bonds with the fibers. The amount of AKD that functionalized the 3D structure was determined gravimetrically after drying and the hydrophobicity was qualitatively determined via water contact angle measurements. Apparent contact angles higher than 120° were measured both on the surface of the foam and in its interior revealing full penetration of the AKD interacting throughout the whole structure.

In a further particular embodiment, the cellulosic sponge is squeezed, and then re-soaked with an aqueous solution comprising a cationic polyelectrolyte which interacts with cellulose via electrostatic bonds, such as cationic starch, cationic polyacrylamide, polyethyleneimine or the like, or an anionic polyelectrolyte which interacts with cellulose via hydrogen bonds, such as carboxymethylcellulose (CMC), ammonium polyphosphate, anionic polyacrylamide or the like. Cationic polyelectrolites, for example, are known in papermaking to stick to cellulose fibers helping with retention of inorganic fillers such as calcium carbonate. Anionic polyelectrolytes such as CMC, on the other hand, can be effectively adsorbed to fibres increasing the water absorbent capacity of the cellulosic sponge, or of the cellulosic foam, in case the sponge is also further dried.

According to a preferred embodiment the process comprises repeating steps c) and d) twice or more times. Accordingly squeezing and resoaking with a first polyelectrolyte solution is carried out, then squeezing and resoaking with a second polyelectrolyte solution is carried out. A third and subsequent polyelectrolyte solutions can be sequentially used, to build up a polyelectrolyte bi- tri-, or multilayer onto surfaces of the cellulose fibers, which is able to confer a myriad of functionalities to the product. The first, second, third, etc., polyelectrolyte solutions may be different in respect to the concentration of polyelectrolyte, and/or the type of electrolyte, etc.

In still another particular embodiment, the cellulosic sponge is squeezed, and then re-soaked with an aqueous solution comprising a compound with the ability of precipitating inside the 3D structure. These type of compounds can be readily determined by the skilled person and can then be easily precipitated inside the 3D sponge through well-known simple techniques based either on physical processes (such as lowering the temperature or evaporating the solvent) or on the addition of precipitating agent (resulting in changes on the pH or on the polarity of the medium).

For example the squeezed sponge may be resoaked with a solution comprising a dissolved salt at a certain temperature. Lowering the temperature of the soaked sponge diminishes the solubility of the salt and causes the salt to precipitate inside the 3D structure. Alternatively the solvent (water) can be evaporated causing as well an increased concentration of the dissolved compound and its precipitation inside the 3D structure. In a further particular embodiment after the sponge is resoaked with a solution comprising a the chemical compound, said compound can be precipitated by adding a precipitating agent like for example a pH modifier compound, an acid or a base, or the polarity of the soaking medium can be changed by incorporating a different solvent to cause precipitation of the chemical compound.

After precipitation, the chemical compound is retained by the cellulosic fibers. Non-limiting examples of these chemical compounds with the ability of precipitating inside the 3D structure are salts which provide new functionalities. Examples are salts which improve the fire performance of the resulting cellulosic sponges or foams (generally called fire retardants) such as sodium tetraborate ($Na_2B_4O_7$) or aluminium hydroxide ($Al_2(OH)_3$) among others; salts which confer biocidal characteristics (generally called biocides) to the resulting cellulosic sponges or foams such as silver chloride (AgCl). copper hydroxide ($Cu(OH)_2$), zinc pyrithione ($C_{10}H_8N_2O_2S_2Zn$), or bis-(N-cyclohexyldiazeniumdioxy)-copper ($C_{12}H_{22}N_4O_4Cu$), among others.

In another aspect the disclosure thus relates to a chemically modified cellulosic sponge. It comprises the same and previously disclosed three dimensional structure of cross-linked cellulosic fibers which are bonded by cyclic acetal groups of the cellulosic sponge and comprises further at least one chemical compound as above disclosed, which can interact with the cellulosic fibers by any type of bonding such as covalent, ionic, electrostatic interaction hydrogen bonding, van der Waals, etc., or be retained within the cellulosic fibers for example for being precipitated inside the structure. Non-limiting examples have been above already disclosed.

In a more particular embodiment, the chemical compound which modifies the cellulosic sponge is an alkyl ketene dimer (AKD) which results covalently bonded to the cellulosic fibers' surface. This is illustrated in Example 11. Accordingly the chemically modified cellulosic sponge is an AKD modified cellulosic sponge Further drying the AKD modified cellulosic sponge renders the corresponding AKD modified cellulosic foam with hydrophobe characteristics.

In another particular embodiment, the chemical compound which modifies the cellulosic sponge is carboxymethyl cellulose (CMC), an anionic polyelectrolyte, which is bonded through hydrogen bonds to the cellulosic fibers' surface. Accordingly the chemically modified cellulosic sponge is a CMC-modified cellulosic sponge. Further drying the CMC-modified cellulosic sponge renders the corresponding CMC modified cellulosic foam.

In still a further aspect the disclosure relates to a process for preparing a cellulosic foam which comprises the following steps:
(i) treating an aqueous suspension of cellulose fibers with periodate to render a dialdehyde cellulose fibers suspension,
(ii) adjusting the pH of the dialdehyde cellulose fibers suspension to a value between 2.5 and 5.5,
(iii) freezing the suspension obtained in step (ii) to render a three dimensional structure, (iv) thawing the three dimensional structure of step (iii) to render a cellulosic sponge, (v) drying the cellulosic sponge to obtain the cellulosic foam.

Steps (i) to (iv) are exactly as described previously in relation with the process for preparing the cellulosic sponge. This process however comprises a further step (v) of drying the cellulosic sponge to obtain a cellulosic foam. Drying can be carried out by any conventional means known in the art until dryness. This fact reveals one of the most remarkable advantages of this disclosure over other cellulose foams of the state of the art, which collapse (turn into a hard dense material) when they are dried by conventional means and therefore require instead costly and very difficult-to-industrialize drying techniques which avoid liquid water in the process, such as freeze-drying or drying with supercritical carbon dioxide. In the context of this disclosure, drying is typically carried out in a simple cost effective manner, under a temperature typically between 80 and 120° C., for example in a conventional device, such as an oven, or a ventilated oven, although other temperatures are also valid without limitation. Drying can take more or less time depending on the temperature and the sponge size, for example two or more days, as in Example 7, or hours such as 2-4 hours at 80-100° C. when the sponge obtained in Example 2 is further dried. According to the present disclosure the water content in the cellulosic foam is lower than 20 wt %, particularly lower than 8 wt %, for example 6 wt %, 4 wt %, 2 wt % or 1 wt % or even lower than 1 wt %.

The cyclic acetal bonds present in the 3D structure in the cellulosic sponge are maintained while and after drying, giving rise to a cellulosic foam which constitutes a further aspect of the disclosure. The cellulosic foam of the disclosure comprises thus a dried three dimensional structure of cellulosic fibers which are bonded by cyclic acetal groups retaining the dimensions of the sponge of origin. Dried in relation with the cellulosic foam is to be understood in the context of the disclosure as meaning a water content in the cellulosic foam lower than 20 wt %, particularly lower than 10 wt %, more particularly lower than 8 wt %, for example 6 wt %, 4 wt %, 2 wt % or 1 wt % or even lower than 1 wt %.

The cellulosic foam of the disclosure shows low density and variable rigidity. The density can vary within a wide range, typically from 15 to 1600 kg/m$^3$, particularly from 35 to 1200 kg/m$^3$, more particularly from 40 to 100 kg/m$^3$. In respect of the variable rigidity, the cellulosic foam of the disclosure can hold more than 5000 times its own weight at 10% deformation.

Both density and rigidity can be easily modulated by changing the processing parameters, for example, the solids content of the dialdehyde cellulose fiber suspension for controlling final density and rigidity.

Compression tests reveal strengths ranging from 0.009 to 0.095 MPa and from 0.01 to 0.11 MPa respectively at 10% or 20% deformation, and compression moduli ($E_c$) in the order of 0.1 to 1.0 MPa as measured in the lab with a Universal Testing machine using 2×2×1.7 cm$^3$ samples and a crosshead rate of 1.7 mm/min (10% deformation per minute, according to EN 826:2013). The compression stress at 10% deformation ($\sigma 10\%$) enables the foam to be classified as rigid ($\sigma_{10\%}$>0.08 MPa), semi-rigid ($\sigma_{10\%}$=0.015-0.08 MPa) or flexible ($\sigma_{10\%}$<0.015 MPa) (DIN 53 421, ISO 844). According to it, this disclosure provides rigid, semi-rigid and flexible foams. These values are inferior to some reported for high-tech nanocellulose foams of similar densities ($\sigma_{10\%}$=0.08-0.38 MPa, $E_c$=0.05-5 MPa), although those have been prepared through expensive and difficult-to-industriallize methodologies which involve, among others, a freeze-drying process (H. Sehaqui, Doctoral Thesis 2011). However, the values obtained are similar or superior to other recent works (e.g. $\sigma_{10\%}$=0.03 MPa $E_c$=0.44 MPa for a 50 kg/m$^3$ foam) which avoid the use of freeze-drying by using nanocellulose to as stabilizer of a Pickering emulsion (Cervin et al., Biomacromolecules 14, p. 503, 2013).

The cellulosic foam of the disclosure has good insulation properties, e.g. a 40 kg/m$^3$ sample has a thermal transmission coefficient of $\lambda$=0.037 W/mK (measured under standard test EN 12667), which is in the range of commercial thermal insulation products such as rockwool.

The cellulosic foam of the disclosure can thus be used for different applications, in which advantage can be taken from its characteristics and properties, for example as building elements or for the fabrication of building elements for construction, like panels. Accordingly the use of the cellulosic foam of the disclosure as building or construction element, or for the fabrication of such an element constitutes a further aspect of the disclosure.

The cellulosic foam can be further chemically modified with different chemical compounds, both water soluble and non-water soluble compounds, such as hydrophobizing agents, fire-retardants, biocides, etc. among others, through different chemical routes rendering a wide variety of new chemically modified cellulosic foams with tailored properties in different degrees which are provided with the present disclosure.

Accordingly in a particular embodiment the process for obtaining the cellulosic foam above disclosed may further comprise one or more of the following steps:

(b) putting in contact the cellulosic foam obtained in step (v) with a solution comprising at least one chemical compound which interacts with or is retained by the cellulosic fibers, (c) optionally applying vacuum to remove the air and force the solution to soak the foam and optionally further, (d) drying to render a chemically modified cellulosic foam.

Similar to the sponge case, two kinds of chemical compounds can be incorporated to the foam, thus bringing to it new characteristics: those which interact with the cellulosic fibers and those which are retained by them.

The solution in step (b), is however not restricted to aqueous solutions as it is in the sponge. Instead a great variety of solvents can be used for the solution, like organic solvents (e.g. ethanol, toluene, THF, etc.) or any mixtures thereof, or with water, a fact which widens the number of the chemical compounds that can be transported in the solution and thus incorporated to the foam. By way of example while cellulosic sponges may be modified with C1-C6 alkyl amines (typically water soluble), the foams can be modified with many other different compounds such as C7-C18 alkyl amines, which are soluble in organic solvents.

In a preferred embodiment vacuum is applied which obviously shortens the process times, accelerating the impregnation process, and improves its efficacy.

Accordingly in a particular embodiment, steps (b) and (c) are carried out following the vacuum-assisted impregnation technique. Further drying of the chemically modified cellulosic foams by any conventional mean (i.e. in an oven) renders a new cellulosic foam material which has been functionalized throughout the entire volume.

Accordingly, a multitude of chemical compounds can be used to bring new functionalities to the cellulosic foam of this disclosure which the skilled person can readily recognize and put into practice following well-established recipes, making the cellulosic foam of the disclosure exploitable in multitude of applications. The new cellulosic foams of the disclosure are functionalized or additivated in different degrees and areas of the foam, like the surface, or throughout the entire volume of the structure.

Non-limiting examples are provided in this patent application to merely illustrate the numerous possibilities which are to be considered as comprised within the scope of the present disclosure.

According to a particular embodiment, the chemical compound comprised in the solution is one which can be precipitated inside the 3D foam through simple techniques based either on physical processes (such as lowering the temperature or evaporating the solvent) or on the addition of precipitanting agent (resulting in changes on the pH or on the polarity of the medium), as previously disclosed for the cellulosic sponges. After precipitation of the chemical compound, said chemical compound is retained by the cellulosic fibers.

Non-limiting examples of these chemical compounds with the ability of precipitating inside the 3D structure are are as above disclosed, salts which provide new functionalities. Examples are salts which improve the fire performance of the resulting cellulosic sponges or foams (generally called fire retardants) such as sodium tetraborate ($Na_2B_4O_7$) or aluminium hydroxide ($Al_2(OH)_3$) among others; salts which confer biocidal characteristics (generally called biocides) to the resulting cellulosic sponges or foams such as silver chloride (AgCl). copper hydroxide ($Cu(OH)_2$), zinc pyrithione ($C_{10}H_8N_2O_2S_2Zn$), or bis-(N-cyclohexyldiazeniumdioxy)-copper ($C_{12}H_{22}N_4O_4Cu$), among others.

Example 14 illustrates this step of chemical modification with sodium tetraborate decahydrated. The cellulosic foam is submerged in an aqueous solution saturated with the salt at moderately high temperature. Vacuum is then applied to remove the air inside the foam forcing the solution to fully soak the entire piece. After recovering the foam and allowing it to cool down to room temperature, the foam shows precipitated and retained sodium tetraborate particles homogeneously distributed inside the structure. The resulting foam presents excellent fire behaviour as determined with fire tests carried out in a calorimetric Cone (FTT) under a 35 kW/m$^2$ Heat Flux. Although the correlation cannot be done directly, results suggest that the best fire classification (B) could be achieved with this type of products. The ultimate fire resistance is determined by the final content of sodium tetraborate inside the structure.

In another embodiment, the cellulosic foam is vacuum-assisted impregnated with an aqueous solution comprising a cationic polyelectrolyte which interacts with cellulose via electrostatic bonds, such as cationic starch, cationic polyacrylamide, polyethyleneimine or the like, or an anionic polyelectrolyte which interacts with cellulose via hydrogen bonds, such as carboxymethylcellulose, ammonium polyphosphate, anionic polyacrylamide or the like. Subsequent impregnations with alternatively two or more kinds of polyelectrolites solutions as above disclosed for the sponge can be used to build up a polyelectrolyte bi-, tri-, or multilayer onto the surfaces of the cellulose fibers, conferring a myriad of functionalities to the product. Accordingly in a preferred embodiment steps b) and c) are repeated twice or more times depending on the desired number of polyelectrolyte layers.

In a further particular embodiment the cellulosic foam is put in contact with a solution containing a compound with the ability of forming covalent bonds with the OH groups of the cellulose, such as the so called papermaking sizing agents (e.g. AKD, ASA, etc.), or with the ability of forming covalent bonds with the aldehyde groups of cellulose, such as primary amine ($NH_2$)-containing species (e.g. C1-C18 alkylamines, C1-C18 alkyldiamines, benzyl amine, chitosan, polyamideamine-epichloridrine resin, proteins, etc.). Vaccum may additionally ba applied to accelerate the process and improve the treatment efficacy.

In another aspect the disclosure thus relates to the chemically modified cellulosic foam.

The chemically modified cellulosic foam obtainable by the above disclosed process, provided by the disclosure, comprises the same and previously disclosed three dimensional structure of cross-linked cellulosic fibers which are bonded by cyclic acetal groups of the cellulosic foam and comprises further at least one chemical compound interacting with or retained by the fibers structure.

Dried in relation with the cellulosic foam is to be understood as meaning a solvent content in the cellulosic foam lower than 20 wt %, particularly lower than 10 w %, more particularly lower than 8 wt %, for example 6 wt %, 4 wt %, 2 wt % or 1 wt % or even lower than 1 wt %.

In another particular embodiment the process for obtaining a chemically modified cellulosic foam may further comprise:
(b) subjecting the cellulosic foam obtained in step (v), to a chemical vapor deposition (CVD) reaction with a reactive chemical compound to render a chemically modified cellulosic foam.

The chemical vapour deposition method is a technique that requires materials of low enough density in order for the reacting gas to penetrate and be effective internally. The reactive chemical compound applied by chemical vapour deposition reaction is not particularly limited. It may be in principle any compound which can be applied by CVD by the skilled person in controlled amounts to achieve different degrees of a certain property of interest. Non-limiting examples are organosilanes, alkyl ketene dimers (AKD) or alkenyl succinic anhydride (ASA). In a particular embodiment the reactive chemical compound applied by chemical vapour deposition reaction is an organosilane.

In principle there is no limitation concerning the organosilane that can be applied by CVD as long as the organosilane is suitable to be applied using this technique. In a particular embodiment trichloromethylsilane (TCMS), dichlorodimethylsilane or chlorotrimethylsilane, among others, can be grafted on the fiber surface. Chemical vapour deposition is usually carried out at moderate to high temperatures, including room temperature due to the high volatility of these compounds.

As illustrated in Example 12 and Example 13 respectively, the TCMS vapour penetrates in more or less degree inside the structure depending on factors like the foam density. Thus in Example 12 it penetrates throughout the entire volume of the foam, rendering it highly hydrophobic, inside and on the surface of the foam, with apparent water contact angles greater than 135°, and in Example 13 the same contact angle is achieved but only on the surface of the foam.

As illustrated also in Example 15 it has been determined that the highly hydrophobic foam shows as well improved fire-behaviour.

The chemically modified cellulosic foam of the disclosure comprises a dried three dimensional structure of cellulosic fibers which are bonded by cyclic acetal groups and at least a chemical compound which interacts with or is retained by the cellulosic fibers.

In a particular embodiment the chemical compound retained by the 3D structure and precipitated is sodium tetraborate salt (see Example 14). Accordingly in a particular embodiment the chemically modified cellulosic foam of the disclosure comprises a dried three dimensional structure of cellulosic fibers and retained sodium tetraborate.

In another particular embodiment the chemical compound is an organosilane, applied by chemical vapour deposition as described above. Accordingly in another particular embodiment the chemically modified cellulosic foam of the disclosure comprises a silylated dried three dimensional structure of cellulosic fibers.

The chemically modified cellulosic foam of the disclosure can be thus used in many applications such as those where its characteristics are of relevance, for example, as building or construction elements or for the fabrication of said building or constructions elements, for example as panels.

Accordingly a further aspect of the disclosure relates to the use of the chemically modified cellulosic foam of the disclosure as building or construction element or for the fabrication of such a building or construction element. Another aspect relates to the use of the chemically modified cellulosic foam of the disclosure as building or construction element or for the fabrication of such a building or construction element in the automotive and aerospacial industries. A further aspect relates to the use of the chemically modified cellulosic foam of the disclosure as scaffold for biomedical applications (such as a template for drug delivery, protective bandage, etc.). In still another aspect the disclosure relates to the use of the chemically modified cellulosic foam of the disclosure as absorbent hygiene products, or as packaging element (rigid trays, foam peanuts, etc.), or as filter in separation technologies (liquid-liquid—such as oil-in-water—, gas-solid—such as dust in air—, heavy metals sequestrant, etc.).

EXAMPLES

Example 1. Process for the Preparation of a Cellulosic Sponge

In one example of the present disclosure, 10 kg of a 10 wt % solids content suspension of never dried thermomechanical pulp (1 kg of dried pulp) was dispersed in tap water under constant stirring to make it a 4 wt % solids content suspension (25 kg in total). This mixture was taken to a reactor totally preserved from light entrance, and added with 2 kg sodium chloride (NaCl) and 0.335 kg sodium metaperiodate (NaIO$_4$). After being allowed to react for 10 h under constant agitation, 0.05 kg of ethylene glycol was poured in to stop the reaction and the resulting mixture containing dialdehyde cellulose (DAC) fibers was filtrated and washed with fresh water twice. Aldehyde content was determined according to the hydroxylamine hydrochloride method reported elsewhere, resulting in an aldehyde concentration of 1 milimol per gram of fibers ([CHO]=1 mmol/g). Never dried dialdehyde cellulose fibers were resuspended in tap water together with 0.3 kg of glacial acetic acid to make up a homogeneous 2 wt % solids content suspension of pH 3. This mixture was then poured into a plastic mold (approx. dimensions 85×55×10 cm$^3$) and taken to a freezer, where it was allowed to freeze at −18° C. overnight. When the frozen sample was thawed at room temperature (taking some 24 h) the product that had been formed in the previous step, keeps the shape of the mold and gets the consistency of a sponge totally soaked in the aqueous medium. The water contained in this sponge can be easily squeezed out without damaging the sponge, which recovers the original shape when it is put back into water. Identical products were obtained following the same procedure by scaling-down all components, with the only relevant variation being was that the smaller the sample the lower the thawing time required.

Example 2. Strong pH Dependence of the Cellulosic Sponge Formation (1)

The procedure of Example 1 was repeated for a 10 g never dried thermomechanical pulp sample (1 g of dried pulp) adjusting the acidity of the medium at pH 4 with 0.25 g of glacial acetic acid and keeping the rest of the process and the relative composition unvaried. An identical cellulosic sponge was formed with the same sponge characteristics.

Example 3. Strong pH Dependence of the Cellulosic Sponge Formation (2)

The procedure of Example 3 was repeated but adjusting the acidity of the medium at pH 3 with 3 drops of a 0.1 molar HCl solution acid and keeping the rest of the process and the relative composition unvaried. An identical cellulosic sponge was formed with the same sponge characteristics.

Example 4. Strong pH Dependence of the Cellulosic Sponge Formation (3)

The procedure of Example 1 was repeated for a 10 g never dried thermomechanical pulp sample (1 g of dried pulp) without adjusting the acidity of the medium. Instead the mixture was allowed to freeze at the pH achieved after resuspending the dialdehyde cellulose fibres in tap water (pH 8.2). The rest of the process was kept unchanged. No cellulosic sponge was formed under these conditions, but instead the process rendered settled fibers in suspension lacking any 3-dimensional structure.

Example 5. Strong pH Dependence of the Cellulosic Sponge Formation (4)

The procedure of Example 2 was repeated for a 10 g never dried thermomechanical pulp sample (1 g of dried pulp) adjusting the acidity of the medium at pH 2 with 3 g of glacial acetic acid and keeping the rest of the process and the proportions unvaried. No cellulosic sponge was formed under these conditions, but instead the process rendered settled fibers in suspension lacking any 3-dimensional structure.

Example 6. Strong pH Dependence of the Cellulosic Sponge Formation (5)

The procedure of Example 2 was repeated for a 10 g never dried thermomechanical pulp sample (1 g of dried pulp) adjusting the acidity of the medium at pH 2 with 4 drops of a 0.1 molar HCl solution and keeping the rest of the process and the proportions unvaried. Again, no cellulosic sponge was formed under these conditions, the process only rendering settled fibers in suspension without any 3D structure.

Example 7. Cellulosic Foam (Useful as Hard Low Density Panel) with Good Insulating Properties The cellulosic sponge obtained in Example 1 was allowed to dry in a ventilated oven at 80° C. for 3 days until dryness.

A cellulosic foam was obtained which retained the dimensions of the sponge. Final density was 40 kg/m$^3$. Compression testing determined compression strength of 0.009 MPa at 10% deformation and of 0.019 MPa at 20% deformation, and a compression modulus of 013 MPa.

This is in the same range of foams made of cellulose nanofibers through expensive and difficult to industrialize methodologies involving, among others, freeze-drying.

Insulation properties were measured according to standard procedure EN 12667, resulting on a thermal transmission coefficient (A) of 0.037 W/mK (in the range of commercial thermal insulation products such as rockwool).

Smaller pieces resulted on products with the same characteristics but more gentle drying conditions were required (e.g. 4 h at 80° C. or 2 h at 100° C. for the product of Example 2).

Example 8. Cellulosic Foam (as Hard Medium Density Panel)

The procedure of Example 2 was repeated at increased solids content of 4 wt % of the mixture being frozen (the rest of the process unchanged). The sponge obtained was allowed to dry in a ventilated oven at 80° C. for 3 days until dryness. A cellulosic foam, useful as a hard medium density panel, was obtained which retained the dimensions of the sponge. Final density was 68 kg/m$^3$.

Example 9. Strong pH Dependence of the Cellulosic Sponge Formation (6)

The product obtained in Example 7 was broken into small pieces (around 1 cm$^3$) and each of them was immersed into an aqueous solution of, respectively, pH 0.5, 2, 4.2, 6.2, 7.7, 9.3, 10.2, 11.3 and 13 prepared with tap water with 0.1N HCl or 0.1N NaOH. The pieces of pH 0.5 to 9.3 got soaked but preserved their shape and the elasticity of the structure even after 36 h under gentle stirring. On the other hand, those soaked in solutions of pH 10.2 to 13 were all disintegrated within a few minutes: the 3D structures were lost, leaving free fibers in suspension, similar to the original dialdehyde cellulose ones.

Example 10. Cellulosic Foam (as Hard Medium-High Density Panel)/Recyclability 100 g of the foam obtained in Example 7 was broken into small pieces and disintegrated in a NaOH aqueous solution of pH 10.2 with agitation. The resulting alkaline suspension of fibers was filtered and washed twice, re-suspended in tap water to make a 10 wt % solids content suspension and further processed following the procedure of Example 1, i.e. acidity was re-adjusted at pH 3 with acetic acid before freezing at −18° C. and thawing at room temperature. A new cellulosic sponge was thus created with similar characteristics to those of Examples 1 and 2, this time based on reused fibers, showing its reciclability. When the new sponge was dried in a ventilated oven at 80° C. for 3 days, a cellulosic foam was obtained (useful as a hard panel with density of 93 kg/m$^3$). Compression testing determined: $\sigma_{10\%}$=0.061 MPa, $\sigma_{20\%}$=0.093 MPa, $E_c$=0.96 MPa.

Example 11. Hydrophobic Cellulosic Foam Modified Internally

As mentioned earlier, when the water is pressed out of the cellulosic sponge the shape remains compressed until it is put back in contact with an aqueous medium, what leads to the total recovery of the original shape (shape-memory material). A small piece (3×3×2 cm$^3$) of the product obtained in Example 8 was squeezed by hand and immersed into a 1 wt % alkyl ketene dimer (AKD, Aquapel T215, Ashland) water emulsion. After this treatment, the sample was dried at 100° C. in an oven for 2 h, leading to the formation of covalent bonds between the AKD and the fibres, and the amount of retained AKD was determined gravimetrically by subtracting the original dry weight from the AKD-treated dry weight (0.6 wt % relative to dried pulp). The hydrophobicity was then qualitatively determined via water contact angle measurements using a goniometer by placing and photographing a 3 microliters water drop on the surface of the foam sample.

Apparent contact angles higher than 120° were measured both on the surface of the sample and in its interior after cutting it by half, revealing that full penetration of the AKD had been achieved. Final density was measured to be 72 kg/m$^3$ and compression tests revealed $\sigma_{10\%}$=0.024 MPa, $\sigma 20\%$=0.048 MPa, Ec=0.34 MPa.

Example 12. Highly Hydrophobic Cellulosic Foam (Self-Cleaning Panel) Modified Internally A piece of approx. 10×3×2.5 cm$^3$ obtained from Example 7 (p=40 kg/m$^3$) was subject to a chemical vapour deposition reaction with trichloromethylsilane (TCMS) in an oven at 50° C. for 2 min. This treatment was enough to obtain full penetration of this vapour throughout the entire piece volume rendering it highly hydrophobic, with apparent water contact angles greater than 135°.

Example 13. Highly Hydrophobic Cellulosic Foam (Self-Cleaning Panel) Modified Only on the Surface A piece of approx. 7×6×5 cm$^3$ obtained from Example 10 (p=90 kg/m$^3$) was subject to a chemical vapour deposition reaction with TCMS in an oven at 50° C. for 2 min. The medium-high density allowed the TCMS gas to penetrate the piece 3 mm of the entire surface but prevented it to penetrate further in. As a result, the treatment rendered the foam with a highly hydrophobic character, with apparent water contact angles greater than 135°, but only on the surface.

Example 14. Cellulosic Foam with Excellent Fire Behaviour

A piece of approx. 10×10×3 cm$^3$ obtained from Example 7 was taken to a glass reactor and submerged with the aid of a weight in 500 mL of a 8 wt % sodium tetraborate decahydrated ($Na_2B_4O_7.10H_2O$) aqueous solution (pH 9) pre-conditioned at 40° C. A 4 MPa (40 mbar) vacuum was applied, removing the air and subsequently forcing the solution to fully soak the entire piece volume. When the bubbling (air coming out of the submerged piece) stopped, what occurred after ca. 3 min, the vacuum was maintained for another 2 min and then released. Afterwards, the treated sample was allowed to cool down to room temperature to have the borate salt precipitated inside the cellulose structure (maximum solubility of the borate in water is 11.2% at 40° C. but only 4.7% at 20° C.), thus avoiding its migration to the surface and leaching out, and finally dried completely at 100° C. for 1 h. A 97% weight increase was determined.

A fire test was carried out to this sample in a calorimetric Cone (FTT) under a 35 kW/m$^2$ Heat Flux. The borate treatment resulted in the total suppression of the inflammation leading instead to a slow carbonization and char formation (more than 40 wt % mass remaining after 600 s under the heat flow). Although the correlation cannot be done directly, this result suggests that the best fire classification (B) could be achieved with this type of products. Results were compared to a reference sample (a similar piece from Example 6 without any further treatment) which as expected was very flammable and burned rapidly leaving nearly no char.

The same procedure was done impregnating identical pieces with, alternatively, a 1 wt % and a 2 wt % $Na_2B_4O_7.10H_2O$ solution at room temperature, in which cases a 9% and a 20% weight increase were found, respectively. Fire results were proportional to the borate content.

Example 15. Superhydrophobic Cellulosic Foam with Improved Fire Performance

A piece of approx. 10×10×3 cm$^3$ obtained from Example 7 was subjected to a chemical vapour deposition reaction with TCMS at room temperature for 4 min. This treatment was enough to obtain full penetration of the vapour throughout the entire piece volume rendering it highly hydrophobic, with apparent water contact angles greater than 135°. This sample was subjected to the fire test described in Example 14 (same experimental conditions). The TCMS treatment provided improved fire performance compared to unmodified reference. In more detail, both the heat released upon ignition and the total heat released after 600 s were reduced by 17%.

Example 16. Medium-High Density Cellulosic Foam Made of Cellulose Nanofibers 10 g of a 10 wt % aqueous suspension of cellulose nanofibers (CNF, previously prepared by passing 5 times a 0.1 wt % bleached softwood kraft pulp water suspension through a Niro Soavi homogenizer) were subject to identical process carried out in Example 1. In detail the CNF suspension was first subject to an oxidation reaction with sodium metaperiodate in the absence of light, for a final [CHO]=3 mmol/g. After the reaction, the sample was centrifuged at 8000 rpm and the supernatant substituted with fresh water twice. Then tap water was added up to a solids content of 2 wt %, the pH of the suspension was adjusted to 3.5 with acetic acid and the mixture was frozen at −18° C. Subsequently, the frozen sample was thawed at room temperature, revealing the formation of a new CNF cellulosic sponge showing up as a sponge with similar properties as described in Example 1. When this sponge was completely dried in an oven at 100° C. for 2 h, a 73 g/m$^3$ hard piece of cellulosic foam was obtained with $\sigma_{10\%}$=0.018 MPa, $\sigma_{20\%}$=0.040 MPa, $E_c$=0.25 MPa.

The invention claimed is:

1. A process for preparing a cellulosic sponge comprising the following steps:
   (i) treating an aqueous suspension of cellulose fibers with periodate to render a dialdehyde cellulose fibers suspension,
   (ii) adjusting the pH of the dialdehyde cellulose fibers suspension to a value between 2.5 and 5.5,
   (iii) freezing the suspension obtained in step (ii) to render a three dimensional structure, and
   (iv) thawing the three dimensional structure obtained in step (iii) to render the cellulosic sponge.

2. The process according to claim 1 wherein the solid content of the dialdehyde cellulose fibers suspension after the adjustment of its pH is comprised between 0.05% and 50% by weight in respect of the total weight of the suspension.

3. A cellulosic sponge comprising a three dimensional structure of cross-linked cellulosic fibers which are bonded by cyclic acetal groups which groups result from the reaction between dialdehyde cellulose fibers with cellulose fibers bearing two neighbouring hydroxyl groups.

4. The process according to claim 1, further comprising:
   (b) squeezing the cellulosic sponge obtained in step (iv), and optionally further comprising the following step:
   (c) re-soaking the squeezed sponge obtained in the previous step with an aqueous composition comprising at least one chemical compound which interacts with or is retained by the cellulosic fibers to obtain a chemically modified cellulosic sponge; and optionally further comprising the following step:
   (d) drying the chemically modified cellulosic sponge to render a chemically modified cellulosic foam.

5. The process according to claim 4, wherein the at least one chemical compound which interacts with or is retained by the cellulosic fibers is selected from the group consisting of: compounds able to form covalent bonds with hydroxyl groups of the cellulose, such as papermaking sizing agents; compounds able to form covalent bonds with dialdehyde groups of the cellulose, such as primary amine ($NH_2$)-containing species; cationic polyelectrolytes; anionic polyelectrolytes; and compounds which can be precipitated inside the sponge.

6. A chemically modified cellulosic sponge comprising a three dimensional structure of cross-linked cellulosic fibers which are bonded by cyclic acetal groups and at least a chemical compound which interacts with or is retained by the cellulosic fibers.

7. The chemically modified cellulosic sponge according to claim 6, wherein the chemical compound is selected from the group consisting of alkyl ketene dimers, alkenyl succinic anhydrides; C1-C6 alkylamines, C1-C6 alkyldiamines, benzyl amine, chitosan, polyamideamine-epichloridrine resins, proteins, cationic starch, cationic polyacrylamide, polyethyleneimine carboxymethylcellulose, ammonium polyphosphate, anionic polyacrylamide, anionic carboxymethylcellulose; sodium tetraborate, aluminium oxide, copper hydroxide, silver chloride, zinc pyrithione, bis-(N-cyclohexyldiazeniumdioxy)-copper, and mixtures thereof.

8. A process for preparing a cellulosic foam comprising the following steps:
   (i) treating an aqueous suspension of cellulose fibers with periodate to render a dialdehyde cellulose fibers suspension,
   (ii) adjusting the pH of the dialdehyde cellulose fibers suspension to a value between 2.5 and 5.5,
   (iii) freezing the suspension obtained in step (ii) to render a three dimensional structure,
   (iv) thawing the three dimensional structure of step (iii) to render a cellulosic sponge, and
   (v) drying the cellulosic sponge to obtain the cellulosic foam.

9. A cellulosic foam comprising a dried three dimensional structure of cellulosic fibers which are bonded by cyclic acetal groups.

10. The process according to claim 8, further comprising:
    (b) putting in contact the cellulosic foam obtained in step (v) in a solution comprising at least one chemical compound which interacts with or is retained by the cellulosic fibers, and optionally further comprising,
(c) applying vacuum to remove the air and force the solution to soak the foam and optionally further comprising,
(d) drying to render a chemically modified cellulosic foam.

11. The process according to claim 10, wherein the at least one chemical compound is selected from the group consisting of compounds able to form covalent bonds with hydroxyl groups of the cellulose, such as papermaking sizing agents; compounds able to form covalent bonds with dialdehyde groups of the cellulose, such as primary amine ($NH_2$)-containing species; cationic polyelectrolytes; anionic polyelectrolytes and compounds which can be precipitated inside the sponge.

12. The process according to claim 8, further comprising:
(b) subjecting the cellulosic foam obtained in step (v), to a chemical vapour deposition reaction with a reactive chemical compound to render a chemically modified cellulosic foam.

13. The process according to claim 12, wherein the reactive chemical compound is selected from the group consisting of organosilanes, alkyl ketene dimers and alkenyl succinic anhydride.

14. A chemically modified cellulosic foam comprising a three dimensional structure of cross-linked cellulosic fibers which are bonded by cyclic acetal groups and at least a chemical compound which interacts with or is retained by the cellulosic fibers.

15. The chemically modified cellulosic foam according to claim 14, wherein the chemical compound is selected from selected from the group consisting of alkyl ketene dimers, alkenyl succinic anhydrides; C1-C18 alkylamines, C1-C18 alkyldiamines, benzyl amine, chitosan, polyamideamine-epichloridrine resins, proteins, cationic starch, cationic polyacrylamide, polyethyleneimine carboxymethylcellulose, ammonium polyphosphate, anionic polyacrylamide, anionic carboxymethylcellulose; sodium tetraborate, aluminium oxide, copper hydroxide, silver chloride, lignin, zinc pyrithione, bis-(N-cyclohexyldiazeniumdioxy)-copper, organosilanes, and mixtures thereof.

* * * * *